United States Patent
Hassi et al.

(10) Patent No.: US 12,474,490 B2
(45) Date of Patent: Nov. 18, 2025

(54) MULTILAYER COLLIMATOR, AND METHOD FOR MANUFACTURING A MULTILAYER COLLIMATOR

(71) Applicant: Hitachi High-Tech Analytical Science Finland Oy, Espoo (FI)

(72) Inventors: Jukka Hassi, Espoo (FI); Vesa Kulkki, Espoo (FI); Heikki Mikander, Espoo (FI); Tuomas Pylkkaenen, Espoo (FI)

(73) Assignee: HITACHI HIGH-TECH ANALYTICAL SCIENCE FINLAND OY, Espoo (FI)

( * ) Notice: Subject to any disclaimer, the term of this patent is extended or adjusted under 35 U.S.C. 154(b) by 296 days.

(21) Appl. No.: 18/295,702

(22) Filed: Apr. 4, 2023

(65) Prior Publication Data

US 2023/0341566 A1  Oct. 26, 2023

(30) Foreign Application Priority Data

Apr. 22, 2022 (EP) ..................................... 22169353

(51) Int. Cl.
*G01T 1/20* (2006.01)
*H10F 39/00* (2025.01)

(52) U.S. Cl.
CPC .......... *G01T 1/2002* (2013.01); *G01T 1/2018* (2013.01); *H10F 39/806* (2025.01)

(58) Field of Classification Search
None
See application file for complete search history.

(56) References Cited

U.S. PATENT DOCUMENTS

| 8,648,313 B2 | 2/2014 | Watanabe et al. |
| 8,835,857 B2 | 9/2014 | Eggert |
| 2009/0173897 A1* | 7/2009 | Decker ............... H01J 5/18 |
| | | 250/505.1 |
| 2013/0037717 A1 | 2/2013 | Eggert |

FOREIGN PATENT DOCUMENTS

DE   102011109822 A1   2/2013

OTHER PUBLICATIONS

Bui Van, A. et al., "A New Method to Reject X-Rays From Energy Range 30 to 150 KeV: Application to the improvement of the angular resolution of an X-ray detector," Nuclear Instruments and Methods, vol. 69, No. 2, Mar. 15, 1969, 6 pages.

(Continued)

*Primary Examiner* — Edwin C Gunberg
(74) *Attorney, Agent, or Firm* — McCoy Russell LLP

(57) ABSTRACT

A multilayer collimator for a radiation detector comprises a first layer of a first attenuator material and a second layer of a second attenuator material, each having a coincident opening therethrough. The second attenuator material has an atomic mass smaller than that of the first attenuator material. The second layer continues into an extension departing from the plane of said second layer. There is at least one location in said second layer where a normal to the surface of said second layer passes through a part of said first layer and into said extension, for locking said first layer and second layer into an assembled configuration of the multilayer collimator.

15 Claims, 5 Drawing Sheets

(56) References Cited

OTHER PUBLICATIONS

"Mounted Pinholes," Thorlabs Optomechanics Sales Catalogue, Thorlabs Website, Available Online at https://www.thorlabs.com/catalogPages/204.pdf, Jan. 1, 2003, 2 pages.
Krawczynski, H. et al., "HX-POL—A Balloon-Borne Hard X-Ray Polarimeter," ArXiv Cornell University Website, Available Online at https://arxiv.org/pdf/0812.1809.pdf, Available as Early as Dec. 10, 2008, Last Revised Jun. 3, 2010, 8 pages.
Beck-Broichsitter, M., "Polymer-coated aperture plates for tailored atomization processes," Materials Science & Engineering C, vol. 110, May 2020, Available as Early as Jan. 13, 2020, 4 pages.
European Patent Office, Extended European Search Report Issued in Application No. 22169353.4, Dec. 1, 2022, Germany, 9 pages.

\* cited by examiner

MULTILAYER COLLIMATOR, AND METHOD FOR MANUFACTURING A MULTILAYER COLLIMATOR

CROSS-REFERENCE TO RELATED APPLICATION

The present application claims priority to European Patent Application No. 22169353.4 filed on Apr. 22, 2022. The entire contents of the above-listed application are hereby incorporated by reference for all purposes.

FIELD OF THE DISCLOSURE

The disclosure is generally related to solid-state semiconductor radiation detectors. In particular, the disclosure is related to hardware used to select and shape the incoming radiation that is to hit and enter the actual detector material. The disclosure is also related to methods used to manufacture such hardware, as well as detectors equipped with such hardware.

BACKGROUND OF THE DISCLOSURE

Solid-state semiconductor radiation detectors are based on the physical phenomenon in which incoming radiation temporarily creates free charges in a semiconductor material. The created free charges may be collected to electrodes and measured, which then allows drawing conclusions about the intensity and/or energy spectrum of the incoming radiation.

FIG. 1 is an exploded view of a known solid-state semiconductor radiation detector, which in this case is a Silicon Drift Detector (SDD) built into a standardized TO-8 package. The outer cover 101 of the package is impermeable to the radiation to be detected except for a radiation window 102 on its upper surface. Stacked on the header plate 103 of the TO-8 package are a thermoelectric cooler element 104, the substrate package 105, and a collimator 106. The substrate package 105 comprises a detector crystal 107 and a substrate 108. Electric connections to and from the thermoelectric cooler element 104 and the substrate package 105 are made with bonding wires (not shown), using the upper ends of the leads 109. In the assembled configuration, the collimator 106 may be directly on top of the substrate package 105 or at a distance therefrom, for example on or close to the inner surface of the radiation window 102. It is also possible to place the collimator 106 outside the package, on top of the radiation window 102. The detector may have more than one collimator, like on top of the substrate package 105 and another under or on top of the radiation window 102.

While the term "collimator" is often used for parts that shape a beam of radiation by only allowing mutually collimated rays to pass, in a radiation detector such as that in FIG. 1 the role of the collimator 106 is merely to allow the incoming radiation to hit only a desired region of the detector crystal 107. There is a problem, however, which is common to all cases where additional hardware is placed between the source of the radiation to be detected and the detector crystal. Said problem is schematically illustrated in FIG. 2. Incoming radiation 201 that hits the collimator 106 (or any other piece of hardware) may generate fluorescent radiation 202 that may penetrate the remaining thickness of the collimator 106 and propagate into the detector crystal and cause interference. If the incoming photon happened to come close to the inner edge of the collimator, an interfering fluorescent photon 203 may also escape through the wall of the central opening in the collimator 106 into a direction towards the detector crystal.

The generation of such unwanted fluorescence depends on a number of factors, one of which is the material of the collimator. From the manufacturing point of view, most straightforward would be to make the collimator of a single material, such as gold, palladium, or silver. A solid-state semiconductor radiation detector equipped with such a collimator might suit well a measurement of which it is known beforehand that the wavelengths of interest will be far from the characteristic fluorescent wavelengths of the collimator material. However, as the most advantageous possibility would be to provide radiation detectors suitable for as many purposes as possible, it is more desirable to look for solutions in which the amount of interfering fluorescence from the collimator could be minimized altogether.

A known solution is a multilayer collimator 306, an example of which is shown in FIG. 3. Materials for the layers are selected in a decreasing order of atomic mass in the propagating direction of the incoming radiation. In other words, the layer 301 that first meets the incoming radiation is of the heaviest (largest Z) material, and the other layers (of which layers 302, 303, and 304 are shown in FIG. 3) are made of materials of successively smaller Z. The idea is then that primary fluorescent radiation created in the first layer 301 becomes absorbed through generation of secondary fluorescence of lower energy in the second layer 302, and so on. FIG. 4 shows a variation of this principle, in which the layered collimator 406 has the layers 302, 303, and 304 of smaller-Z materials in the same order extending also along the surface of the central opening.

A reference document that discloses layered collimators is U.S. Pat. No. 8,835,857. Another reference document U.S. Pat. No. 8,648,313 considers layered screening structures between the substrate package and the cooling element, for keeping fluorescent radiation generated in the cooling element (by energetic radiation that went through the substrate package) from propagating backwards towards the detector crystal. A known drawback of layered collimators like those in FIGS. 3 and 4 and said reference documents is the correspondingly more complicated manufacturing and assembling process of the solid-state semiconductor radiation detector.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect, a multilayer collimator for a radiation detector comprises a first layer of a first attenuator material of fluorescent X-rays, said first layer having an opening therethrough, and a second layer of a second attenuator material of fluorescent X-rays, said second layer having an opening therethrough coincident with the opening in said first layer. Said second attenuator material has an atomic mass smaller than the atomic mass of said first attenuator material. Said second layer continues into an extension departing from the plane of said second layer, wherein there is at least one location in said second layer where a normal to the surface of said second layer passes through a part of said first layer and into said extension, for locking said first layer and second layer into an assembled configuration of the multilayer collimator.

According to an embodiment, said extension continues along and covers the whole limiting surface around said opening. This involves at least the advantage that the extension may constitute a part of a layered structure the purpose of which is to guard against secondary fluorescent photons that could escape through the walls of the opening.

According to an embodiment, said extension has a first portion continuing from said second layer essentially perpendicular to said first and second layers and a second portion continuing from said first portion on the other side of said first layer than the second layer. This involves at least the advantage that the structure can be formed by using a protruding extension as a central axis, around which one or more annular layers are placed, and thereafter bending a remaining protruding part of the extension outwards and onto the stack of layers to form said second portion.

According to an embodiment, said extension has a portion that continues along at least a part of edges of said opening at an oblique angle against said first and second layers. This involves at least the advantage of a variety of possibilities concerning the three-dimensional geometry of the multilayer collimator.

According to an embodiment, said extension is a first extension and said second layer continues into a second extension along at least a part of outer edges of the multilayer collimator. There can then be at least one location in said second layer where a normal to the surface of said second layer passes through a part of said first layer and into said second extension. This involves at least the advantage that the second extension may add structural strength.

According to an embodiment, the multilayer collimator comprises a third layer of said second attenuator material, said third layer having an opening therethrough coincident with the openings in said first and second layers. Said third layer may be on the other side of said first layer than said second layer. This involves at least the advantage that the second and third layers may be formed through a deposition method.

According to an embodiment, the multilayer collimator comprises more than two layers, at least three of said more than two layers being of materials of different atomic masses. This involves at least the advantage of enhanced attenuation of unwanted fluorescent radiation.

According to an embodiment, said first layer is a centre layer of said more than two layers. The multilayer collimator may then be symmetric, with respect to composition of layers, in relation to the plane of said first layer. This involves at least the advantage that the orientation of the multilayer collimator during assembling is not important.

According to a second aspect, there is provided a solid-state semiconductor radiation detector, comprising at least one multilayer collimator of a kind described above.

According to a third aspect, there is provided a method for manufacturing a multilayer collimator. The method comprises producing a first layer of a first attenuator material of fluorescent X-rays so that said first layer becomes to have an opening therethrough and producing a second layer of a second attenuator material of fluorescent X-rays so that said second layer becomes to have an opening therethrough. Said second attenuator material has an atomic mass smaller than the atomic mass of said first attenuator material. The method comprises also continuing said second layer into an extension along at least a part of the edges of said opening and making the opening in said second layer coincident with the opening in said first layer. The method comprises also locking said first layer and second layer into an assembled configuration of the multilayer collimator by forming at least a part of said extension so that there is at least one location in said second layer where a normal to the surface of said second layer passes through a part of said first layer and into said extension.

According to an embodiment, said locking of said first layer and second layer into said assembled configuration comprises shaping said extension or a part thereof after assembling said first layer and said second layer together. This involves at least the advantage that a relatively simple and straightforward manufacturing methods can be used.

According to an embodiment, said shaping of said extension or a part thereof comprises bending an extremity of said extension onto a side of said first layer opposite to the side that is towards said second layer. This involves at least the advantage that the structure can be formed by using a protruding extension as a central axis, around which one or more annular layers are placed, and thereafter bending a remaining protruding part of the extension outwards and onto the stack of layers to form said second portion.

According to an embodiment, the opening through the first layer is of a larger diameter than the opening through said second layer, and said shaping of said extension or a part thereof comprises expanding said extension or a part thereof against the edge that defines the opening through the first layer. This involves at least the advantage of a variety of possibilities concerning the three-dimensional geometry of the multilayer collimator.

According to an embodiment, said locking of said first layer and second layer into said assembled configuration comprises making said second layer cover at least a majority of two opposite sides of the first layer. This involves at least the advantage of allowing the use of a large selection of manufacturing methods.

According to an embodiment, said second layer is produced by depositing onto said first layer. This involves at least the advantage that the first and second layers may become very tightly bound together already during manufacturing.

BRIEF DESCRIPTION OF THE DRAWINGS

The accompanying drawings, which are included to provide a further understanding of the disclosure and constitute a part of this specification, illustrate embodiments of the disclosure and together with the description help to explain the principles of the disclosure. In the drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 5:
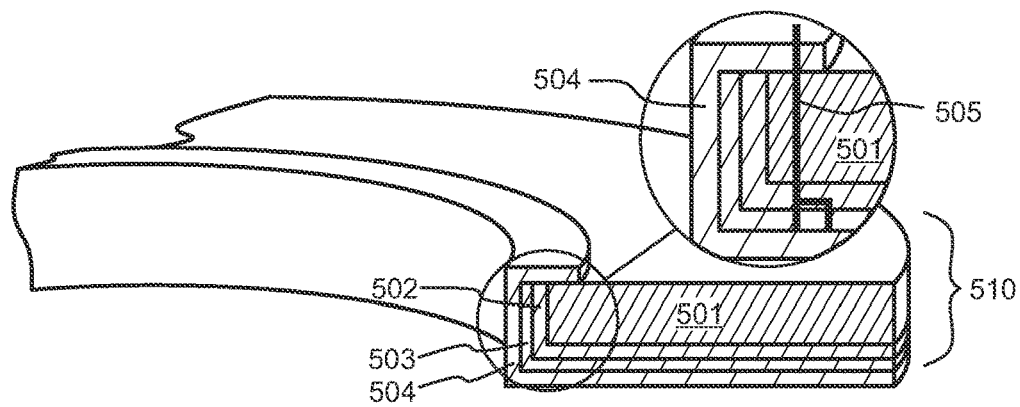
FIG. 5 illustrates a multilayer collimator according to an embodiment.

FIG. 5 is a partial cut-out view of a multilayer collimator 510 for a radiation detector. The multilayer collimator 510 is assumed to have a generally annular form, but for describing its features below, only a part thereof is shown in the drawing. The opening in the centre of the generally annular form is seen in the front left part of FIG. 5. The surface facing the viewer in the front right part of FIG. 5 is a figurative cut-out surface intended to illustrate a layered structure of the multilayer collimator 510.

Here, and also in the other embodiments described below, the annular form of the multilayer collimator 510 may be assumed to be that of a regular, circular ring. While collimators in the shape of a regular, circular ring are often used in solid-state semiconductor radiation detectors, any of the multilayer collimators described here could have also some other general shape, such as a square, hexagon, or octagon for example. For acting as a collimator, i.e. in order to effectively allow only a selected portion of incoming radiation to hit a substrate package, the collimator should have an opening therethrough—hence the general designation of the shape being annular.

While an important application of collimators of this kind is in solid-state semiconductor radiation detectors, it should be noted that the same structural principle and manufacturing method may be used for collimators in other kinds of radiation detectors, such as gas-filled proportional counters for example.

The multilayer collimator 510 in FIG. 5 comprises a first layer 501 of a first attenuator material of fluorescent X-rays. Conforming with the generally annular shape of the collimator, the first layer 501 has an opening therethrough. Additionally, the multilayer collimator 510 in FIG. 5 comprises other layers, marked with the reference designators 502, 503, and 504. Being layers in the multilayer collimator, these comprise other attenuator materials of fluorescent X-rays. Any of layers 502, 503, 504 (or even them all considered together) could be designated as the "second" layer for the purpose of verbal description. Here, layer 504 in particular will be considered as the "second" layer. Conforming with the generally annular shape of the collimator, each of the layers 502, 503, and 504 has an opening therethrough coincident with the opening in the first layer 501.

Preferably, but not mandatorily, the layers 502, 503, and 504 are made of attenuator materials that have atomic masses smaller than the atomic mass of the first attenuator material of the first layer 501. Following the common principle in multilayer collimators, the materials of said layers may form a series of consecutively decreasing atomic masses. In general, at least the "second" layer 504 is made of a second attenuator material that has an atomic mass smaller than the atomic mass of the first attenuator material.

In order to keep the relations between generated and attenuated fluorescent radiation wavelengths straightforward, it is preferable to use essentially pure elements as attenuator materials. Essentially pure means in this respect that the material consists of a single element to an extent that is practically achievable at reasonable cost. In such a case it is also relatively unambiguous to characterise the attenuator materials through their atomic masses. In case a layer consists of more than one element, its atomic mass should be considered to mean a characteristic atomic mass that explains a majority of observed fluorescent properties of such a material on the wavelengths of interest. If two or more layers are considered together as a "layer" for the purpose of verbal description, the atomic masses of the materials of both or all such layers should be considered together.

Figure 1:
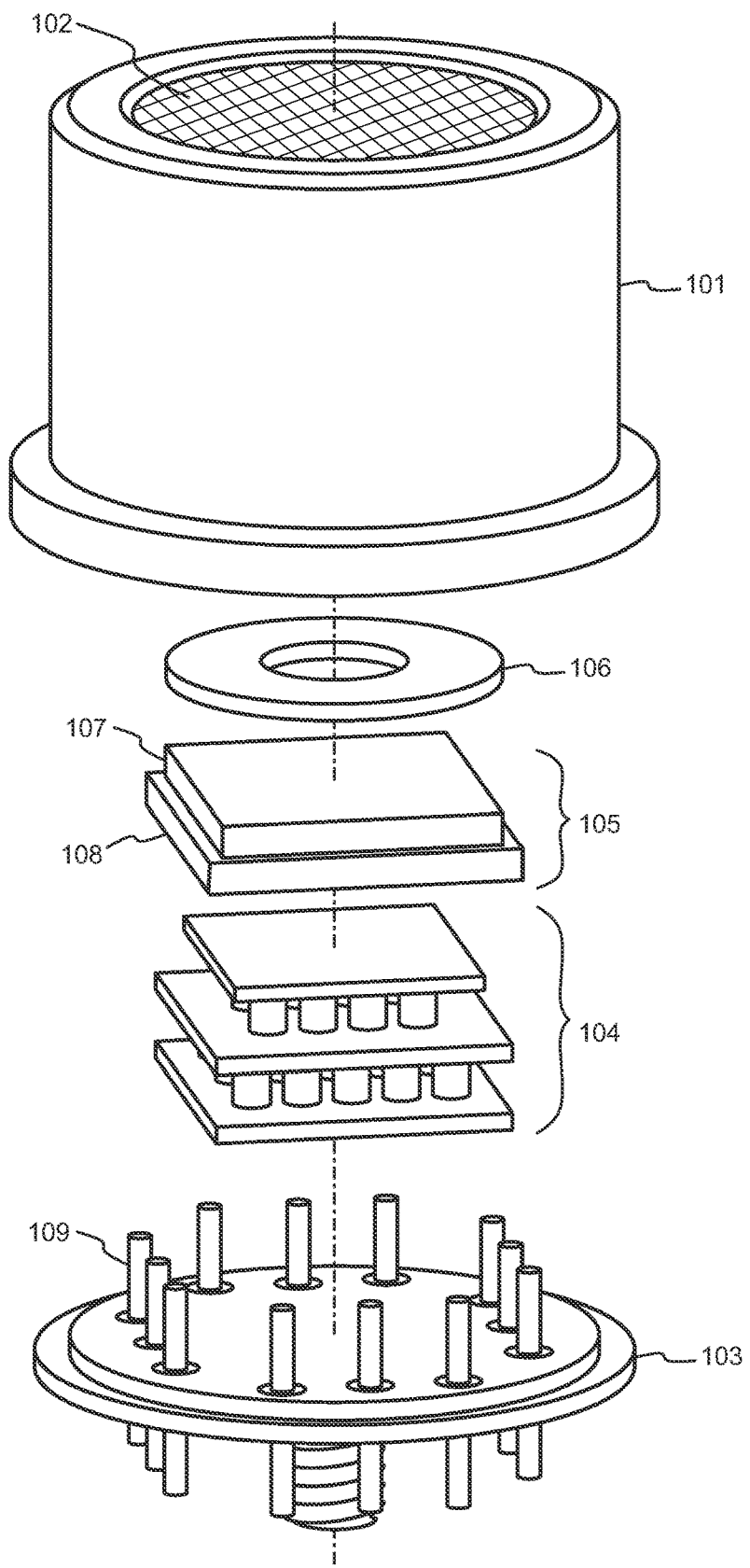
FIG. 1 illustrates a solid-state semiconductor radiation detector.
Figure 2:
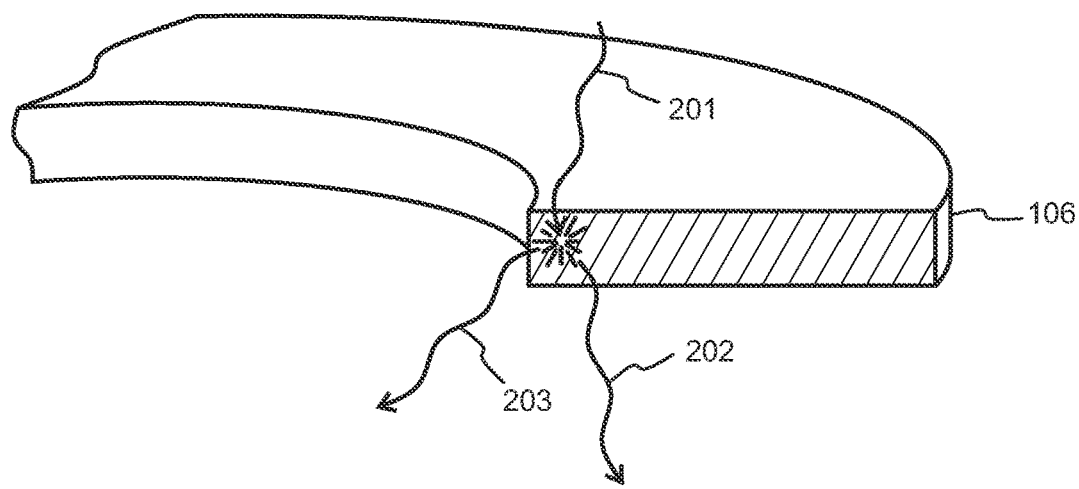
FIG. 2 illustrates the generation of interfering fluorescence in a collimator.
Figure 3:
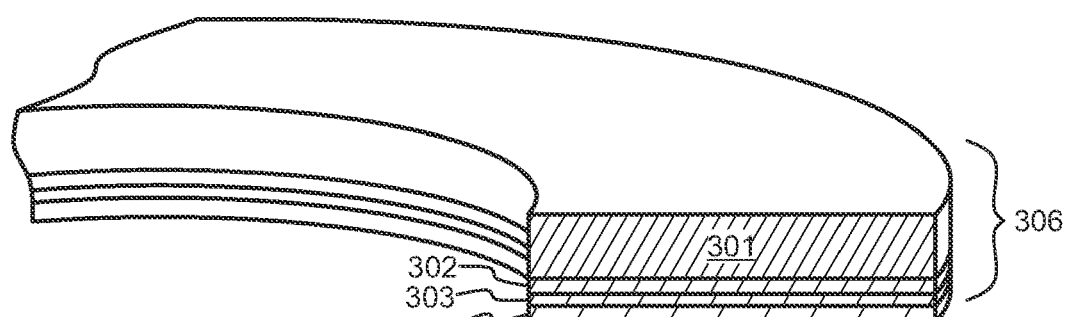
FIG. 3 illustrates a known multilayer collimator.
Figure 4:
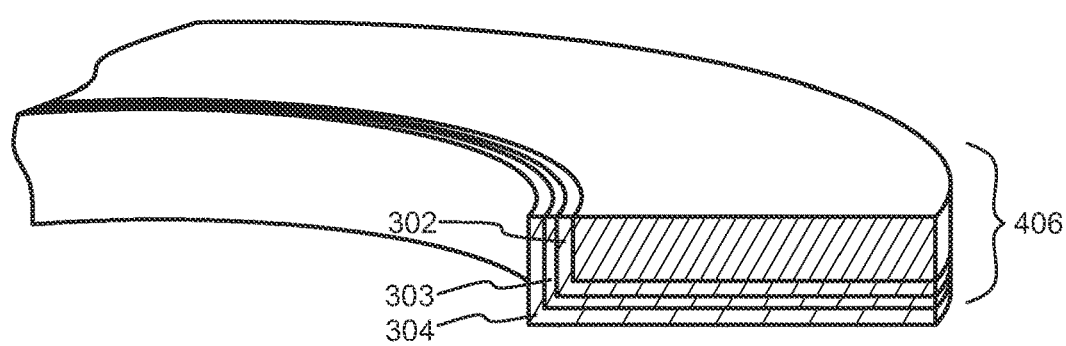
FIG. 4 illustrates a known multilayer collimator.

The same layered structure exists also on the inner edge of the collimator, i.e. on the surface that limits the opening at the centre of the annular form. As a difference to the collimator structure described earlier in this text with reference to FIG. 4, at least one of those layer portions that extend onto the edges of the opening is also used to hold the layered structure mechanically together.

Considering the "second" layer 504 in particular, it continues into an extension departing from the plane of the second layer 504. In FIG. 5 the extension reaches upwards (in relation to the orientation shown in FIG. 5) along the edges of the opening and partly above and onto the first layer 501. The partial enlargement in FIG. 5 illustrates how there is at least one location in the second layer 504 where a normal 505 to the surface of the second layer passes through a part of the first layer 501 and into said extension. Said surface, on which the normal 505 is drawn, is the flat surface of the second layer 504 facing towards the first layer 501. As a result, the first 501 and second 504 layer (as well as the other layers 502 and 503) are locked into an assembled configuration of the multilayer collimator 510.

FIG. 5 shows an example of a multilayer collimator in which the extension in the second layer 504 continues along and covers the whole limiting surface around the opening in the centre of the collimator. This is a consequence of the extension also forming a part of the overall layered structure of the collimator along the edges of the opening. This is not the only possibility, however, as will be shown in more detail later in this text.

Figure 6:
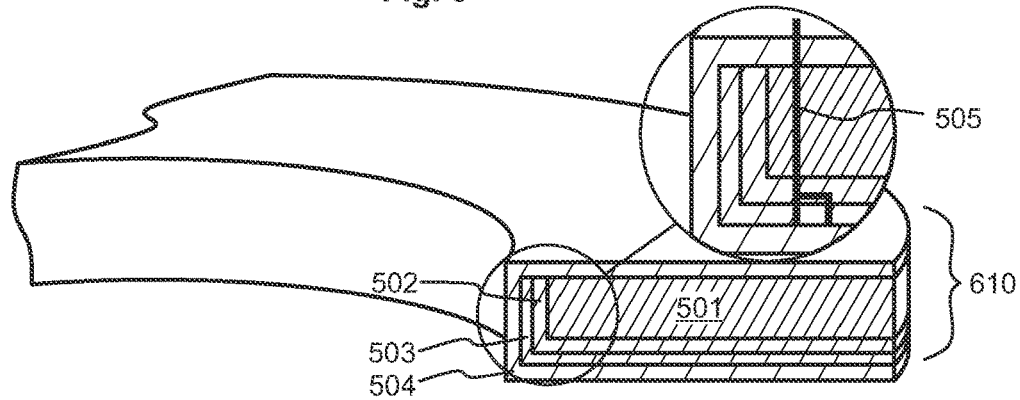
FIG. 6 illustrates a multilayer collimator according to an embodiment.

FIG. 5 also shows an example of a multilayer collimator in which the extension has a first portion continuing from said second layer 504 essentially perpendicular to said first 501 and second 504 layers, and a second portion continuing from said first portion on the other side of said first layer 501, where "other side" means other than the side facing towards the second layer 504. In the embodiment of FIG. 5 said second portion continues only partly onto said other side of the first layer 501, forming a lip around the edges of the opening in the first layer 501. FIG. 6 shows an example of a multilayer collimator 610 that is otherwise similar to that of FIG. 5 but the second portion of the extension continues outwards on top of the first layer 501, covering essentially the whole upper surface of the first layer 501.

Figure 7:
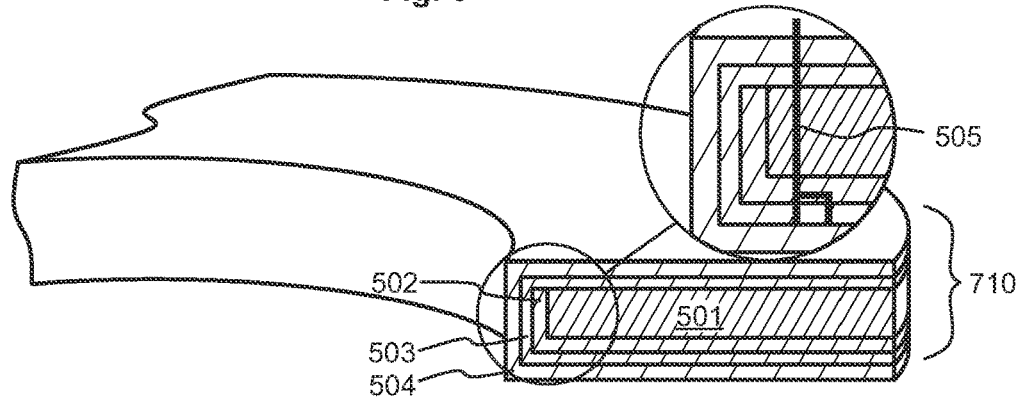
FIG. 7 illustrates a multilayer collimator according to an embodiment.
Figure 8:
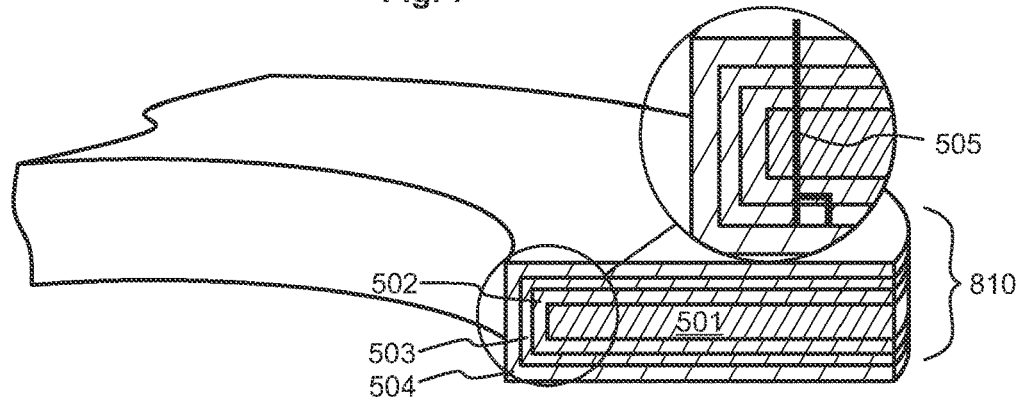
FIG. 8 illustrates a multilayer collimator according to an embodiment.

In the embodiments of FIGS. 5 and 6 the intermediate layers between the first 501 and second 504 layers have extensions that form part of the overall layered structure of the collimator around the central opening but do not take part in the solution by which the layers are locked together into the assembled configuration. FIGS. 7 and 8 show examples of multilayer collimators 710 and 810 respectively, in which one or more of said intermediate layers also continue into extensions on the other side of the first layer 501. In general, in all embodiments the multilayer collimator may comprise more than two layers so that at least three of such more than two layers are of materials of different atomic masses.

Figure 9:
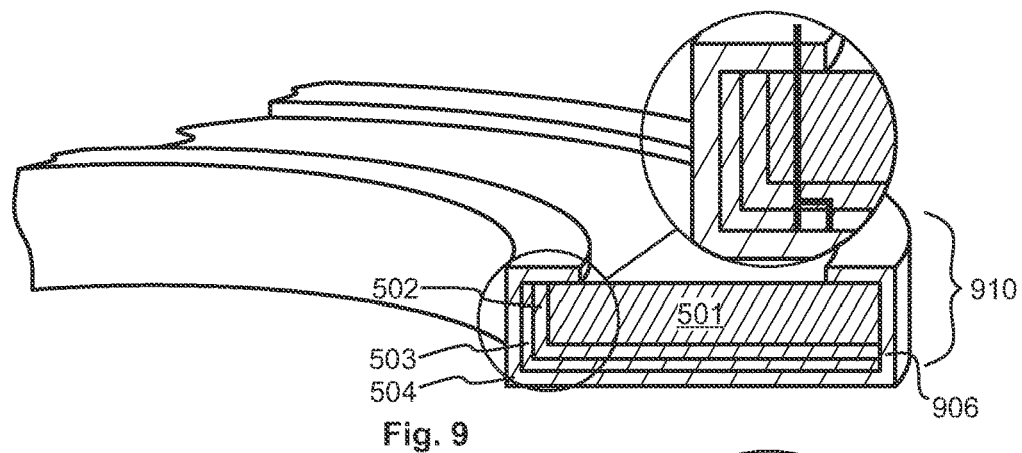
FIG. 9 illustrates a multilayer collimator according to an embodiment.

FIG. 9 shows an example of a multilayer collimator 910 in which there are two extensions from the second layer 504. The first extension around the edges of the central opening of the collimator is of the kind described above with reference to FIG. 5. At its outer edge, the second layer 504 continues into a second extension 906 along at least a part of the outer edges of the multilayer collimator. Although the partial enlargement in FIG. 9 illustrates only the structure closest to the first extension, it is easy to see in FIG. 9 that there is at least one location in the second layer 504 where a normal to the surface of the second layer 504 passes through a part of the first layer 501 and into the second extension, namely to that portion thereof that extends onto the top surface of the first layer 501.

Figure 10:
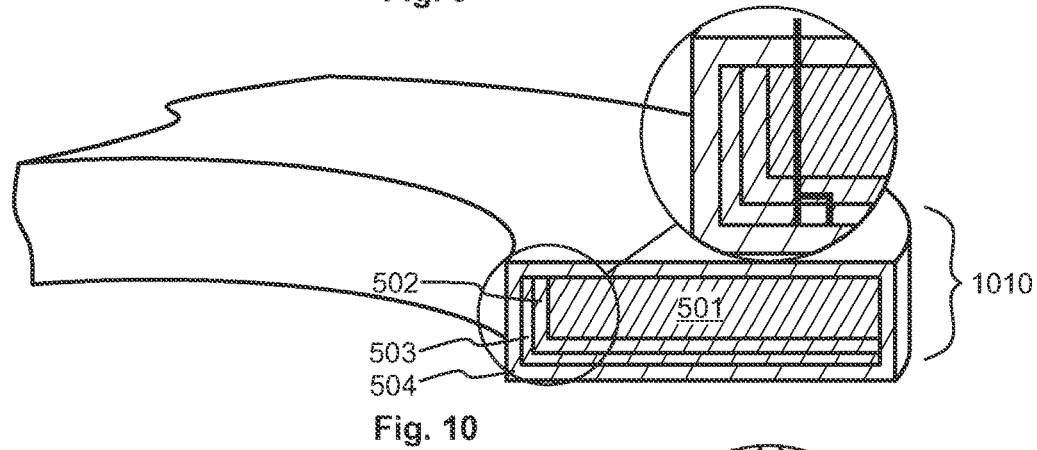
FIG. 10 illustrates a multilayer collimator according to an embodiment.

FIG. 10 shows an example of a multilayer collimator 1010 in which the portions of the first and second extensions on top of the first layer 501 in FIG. 9 have been continued towards each other, to the extent that together they form a continuous layer of the second attenuator material on top of the first layer 501. This structural principle may be generally described so that the multilayer collimator comprises a third layer, made of the same second attenuator material as the second layer 504 described above, said third layer having an opening therethrough coincident with the openings in the first and second layers, and said third layer being on the other side of said first layer 501 than said second layer 504.

Following the examples shown above in FIGS. 7 and 8, one or more of the intermediate layers may also continue partly or completely around the first layer 501 in the cross-section of the multilayer collimator. On one such example the first layer 501 is a centre layer of the more than two layers of the multilayer collimator, and the multilayer collimator is symmetric (with respect to composition of layers) in relation to the plane of the first layer 501.

Figure 11:
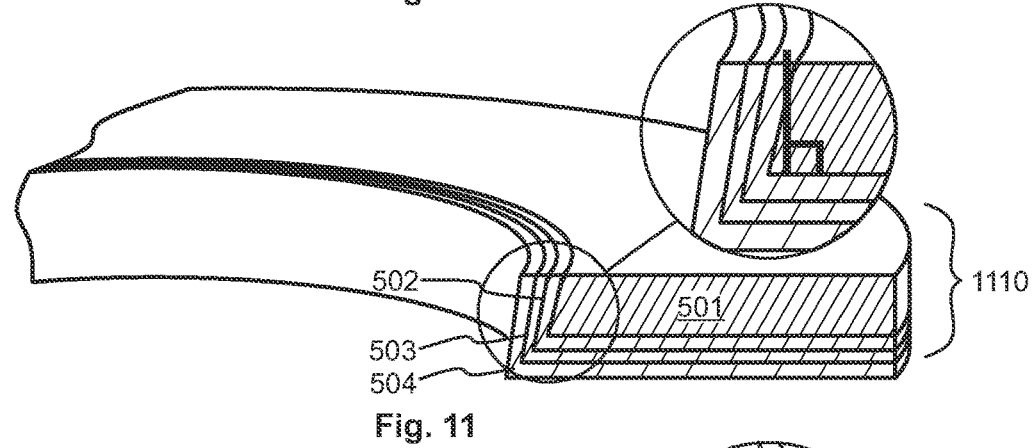
FIG. 11 illustrates a multilayer collimator according to an embodiment.
Figure 12:
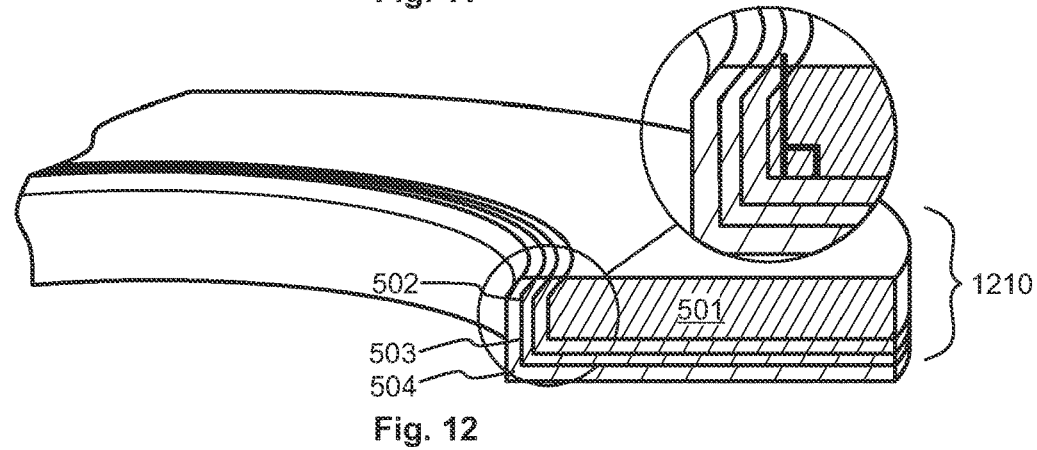
FIG. 12 illustrates a multilayer collimator according to an embodiment.

FIGS. 11 and 12 show examples of a multilayer collimator 1110 in which the extension has a portion that continues along at least a part of the central opening of the multilayer collimator at an oblique angle against the first and second layers. In FIG. 11, said oblique angle is so close to 90 degrees and/or the overall thickness of the structure is so small that there is no location in the lowest layer 504, frequently referred to as the "second" layer above, where a normal to the surface of said layer would pass through a part of the first layer 501 and into the obliquely rising extension of the lowest layer 504. However, as already pointed out earlier in this text, one may consider the stack of layers 502, 503, and 504 as the "second" layer to see that said characteristic feature also exists in the multilayer collimator 1110 of FIG. 11. The same is true for the multilayer collimator 1210 of FIG. 12, in which the extensions each have a perpendicularly rising portion that continues into an obliquely rising portion.

Embodiments such as those in FIGS. 11 and 12 could also be characterised so that in a multilayer collimator with three or more layers, each of the second, third, etc. layers—counting downwards in order from the first layer—has an extension the form of which locks that layer together with all other layers above it into an assembled configuration of the multilayer collimator. This same characterisation may naturally apply also to embodiments with no obliquely oriented portions of extensions, such as that of FIG. 8 for example.

Figure 13:
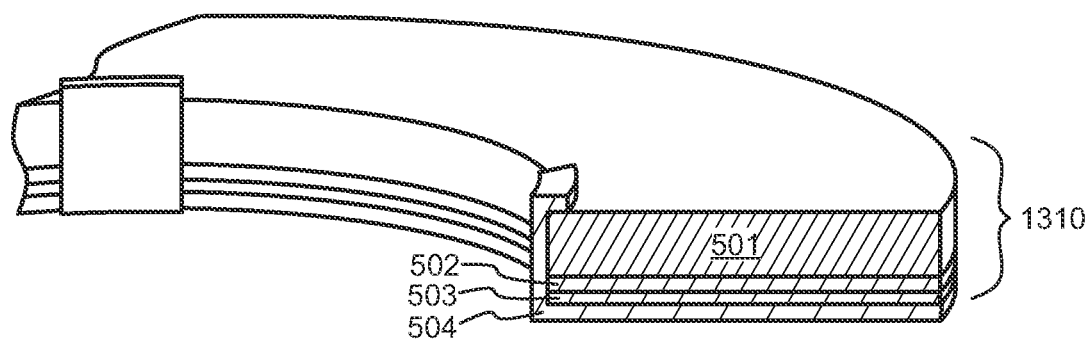
FIG. 13 illustrates a multilayer collimator according to an embodiment.

Above it was already mentioned that it is not obligatory to make the extension—the form of which locks the layers together into an assembled configuration of the multilayer collimator—extend all the way along the edge that limits the central opening of the collimator. FIG. 13 shows an example of a multilayer collimator 1310 in which there are multiple extensions from the "second" layer 504, each forming just a strip bent around the inner edge of the stack of layers and onto the top of the first layer 504.

Figure 14:
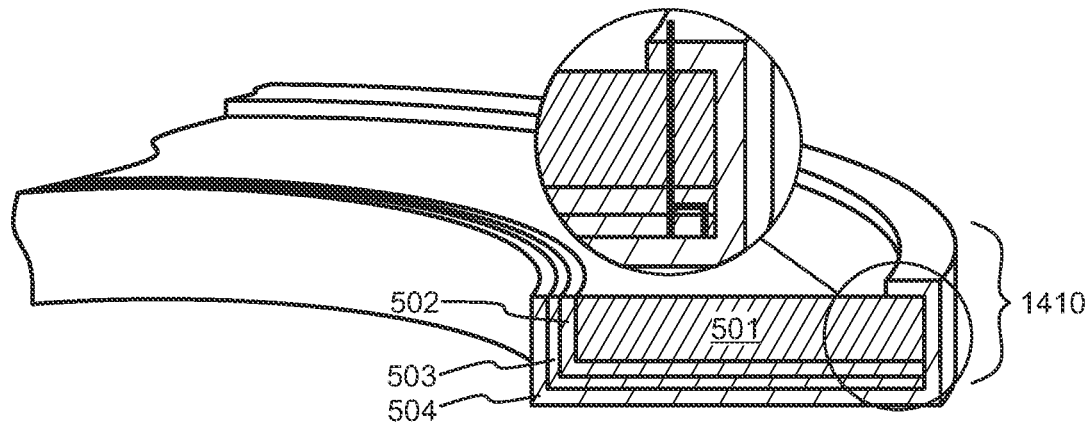
FIG. 14 illustrates a multilayer collimator according to an embodiment.

FIG. 14 is a reminder of the fact that not all embodiments need to have the extension—the form of which locks the layers together into an assembled configuration of the multilayer collimator—along the edge that limits the central opening of the collimator. The multilayer collimator 1410 of FIG. 14 has the layered structure on its inner edge around the opening, but none of the layers there form any such extension that would lock the layers together into an assembled configuration. Rather, the "second" layer 504 has such an extension at its outer edge, i.e. at the outer rim of the multilayer collimator.

Figure 15:
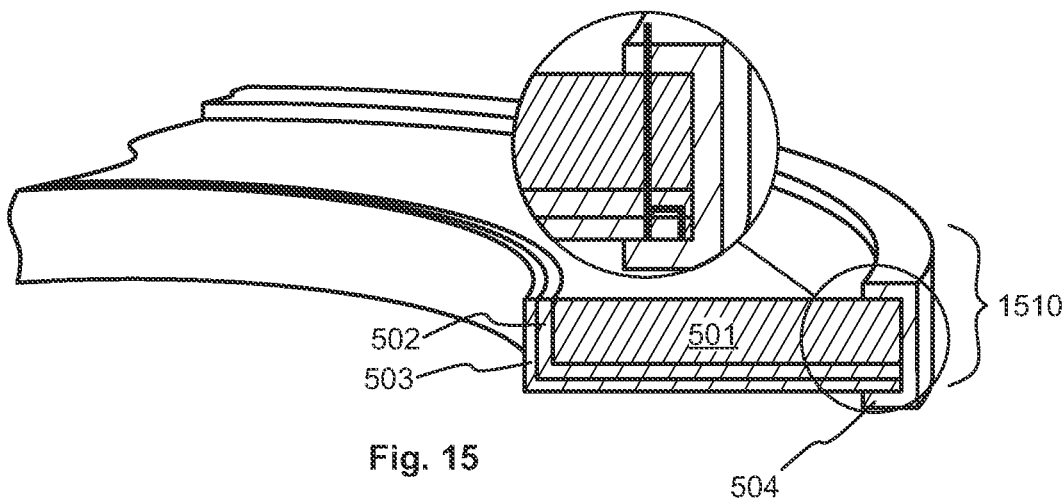
FIG. 15 illustrates a multilayer collimator according to an embodiment.

FIG. 15 is a reminder of the fact that the "second" layer that also defines—through its extension—the form that locks the layers together into an assembled configuration of the multilayer collimator does not need to cover the whole surface area of the multilayer collimator. The multilayer collimator 1510 of FIG. 15 has the "second" layer 504 only as a lip at the lower part of a circular clamp that encircles the outer rim of the multilayer collimator 1510.

Method embodiments for manufacturing a multilayer collimator comprise producing a first layer of a first attenuator material of fluorescent X-rays so that said first layer becomes to have an opening therethrough, and producing a second layer of a second attenuator material of fluorescent X-rays so that said second layer becomes to have an opening therethrough, wherein said second attenuator material has an atomic mass smaller than the atomic mass of said first attenuator material. The method embodiments also comprise continuing said second layer into an extension departing from the plane of said second layer. The opening in said second layer must be made coincident with the opening in the first layer. The method embodiments then comprise locking said first layer and second layer into an assembled configuration of the multilayer collimator by forming at least a part of said extension so that there is at least one location in said second layer where a normal to the surface of said second layer passes through a part of said first layer and into said extension.

If the second layer is made of a malleable material such as aluminium or other metal, the method step of locking the layers into an assembled configuration may comprise shaping said extension or a part thereof after assembling said first layer and said second layer together. The extension may first constitute a straight cylindrical surface, around which the annular first layer (and possible intermediate layers, all having the corresponding annular shape) is placed. The edge of the cylindrically formed extension may then be bent outwards so that it becomes a lip encircling the central opening of the multilayer collimator on top of the stack of layers. Depending on the details of the structure, said method step may contain also other forms of bending an extremity of said extension onto a side of said first layer opposite to the side that is towards said second layer.

In method embodiments that aim at producing multilayer collimators like those of FIGS. 11 and 12, the opening through the first layer may first be of a larger diameter than the opening through said second layer. The shaping of said extension or a part thereof may then comprise expanding said extension or a part thereof against the edge that defines the opening through the first layer. The result is then a multilayer collimator in which said extension has a portion that continues along at least a part of edges of said opening at an oblique angle against said first and second layers.

The method step of locking said first layer and second layer into said assembled configuration may also comprise making said second layer cover at least a majority of two opposite sides of the first layer, like in FIGS. 6, 7, 8, and 10. Such a structure may be produced for example by using a deposition method to form the second layer onto the first layer.

The term "fluorescent X-rays" is primarily used in this text to mean X-rays emitted as characteristic "secondary" X-rays from a material that has been excited by being bombarded with high-energy X-rays or gamma rays. Wavelengths of fluorescent X-rays that are commonly used for elemental analysis of chemical substances and compounds vary from the 0.05357 nanometers $K\alpha_1$ line of cadmium to the 6.76 nanometers $K\alpha$ line of boron. Also the 11.40 nanometers $K\alpha$ line of beryllium and the 22.80 $K\alpha$ line of lithium are sometimes referred to as fluorescent X-rays, although X-rays in general are considered to range from 10 picometers to 10 nanometers.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A multilayer collimator for a radiation detector, comprising:
   a first layer of a first attenuator material of fluorescent X-rays, said first layer having an opening therethrough, and
   a second layer of a second attenuator material of fluorescent X-rays, said second layer having an opening therethrough coincident with the opening in said first layer;
   wherein said second attenuator material has an atomic mass smaller than the atomic mass of said first attenuator material,
   wherein said second layer continues into an extension departing from the plane of said second layer, wherein there is at least one location in said second layer where a normal to the surface of said second layer passes through a part of said first layer and into said extension, for locking said first layer and second layer into an assembled configuration of the multilayer collimator, and
   wherein said openings are configured to allow incoming radiation to hit only a desired region of a detector crystal placed adjacent to the multilayer collimator.

2. A multilayer collimator according to claim 1, wherein said extension continues along and covers the whole limiting surface around said opening.

3. A multilayer collimator according to claim 1, wherein said extension has a first portion continuing from said second layer essentially perpendicular to said first and second layers and a second portion continuing from said first portion on the other side of said first layer than the second layer.

4. A multilayer collimator according to claim 3, comprising a third layer of said second attenuator material, said third layer having an opening therethrough coincident with the openings in said first and second layers, and said third layer being on the other side of said first layer than said second layer.

5. A multilayer collimator according to claim 1, wherein said extension has a portion that continues along at least a part of edges of said opening at an oblique angle against said first and second layers.

6. A multilayer collimator according to claim 1, wherein:
said extension is a first extension,
said second layer continues into a second extension along at least a part of outer edges of the multilayer collimator, wherein there is at least one location in said second layer where a normal to the surface of said second layer passes through a part of said first layer and into said second extension.

7. A multilayer collimator according to claim 1, wherein:
the multilayer collimator comprises more than two layers, at least three of said more than two layers being of materials of different atomic masses.

8. A multilayer collimator according to claim 7, wherein:
said first layer is a centre layer of said more than two layers, and
said multilayer collimator is symmetric, with respect to composition of layers, in relation to the plane of said first layer.

9. A solid-state semiconductor radiation detector, comprising at least one multilayer collimator according to claim 1 and a detector element of fluorescent X-rays.

10. A method for manufacturing a multilayer collimator, the method comprising:
producing a first layer of a first attenuator material of fluorescent X-rays so that said first layer becomes to have an opening therethrough,
producing a second layer of a second attenuator material of fluorescent X-rays so that said second layer becomes to have an opening therethrough, wherein said second attenuator material has an atomic mass smaller than the atomic mass of said first attenuator material,
continuing said second layer into an extension along at least a part of the edges of said opening,
making the opening in said second layer coincident with the opening in said first layer, and
locking said first layer and second layer into an assembled configuration of the multilayer collimator by forming at least a part of said extension so that there is at least one location in said second layer where a normal to the surface of said second layer passes through a part of said first layer and into said extension.

11. A method according to claim 10, wherein said locking of said first layer and second layer into said assembled configuration comprises shaping said extension or a part thereof after assembling said first layer and said second layer together.

12. A method according to claim 11, wherein said shaping of said extension or a part thereof comprises bending an extremity of said extension onto a side of said first layer opposite to the side that is towards said second layer.

13. A method according to claim 11, wherein the opening through the first layer is of a larger diameter than the opening through said second layer, and said shaping of said extension or a part thereof comprises expanding said extension or a part thereof against the edge that defines the opening through the first layer.

14. A method according to claim 10, wherein said locking of said first layer and second layer into said assembled configuration comprises making said second layer cover at least a majority of two opposite sides of the first layer.

15. A method according to claim 14, wherein said second layer is produced by depositing onto said first layer.

* * * * *